United States Patent [19]

Spanier

[11] Patent Number: 4,904,494

[45] Date of Patent: Feb. 27, 1990

[54] CHEWY DOG SNACKS

[75] Inventor: Henry C. Spanier, West Milford, N.J.

[73] Assignee: Nabisco Brands, Inc., East Hanover, N.J.

[21] Appl. No.: 242,292

[22] Filed: Sep. 9, 1988

[51] Int. Cl.$^4$ ............................................... A23K 1/00
[52] U.S. Cl. ..................... 426/646; 426/512; 426/549; 426/623; 426/630; 426/641; 426/805
[58] Field of Search ............... 426/641, 646, 623, 630, 426/805, 512, 549

[56] References Cited

U.S. PATENT DOCUMENTS

| | | |
|---|---|---|
| 3,115,409 | 12/1963 | Hallinan et al. ................ 426/641 |
| 3,139,342 | 6/1964 | Linskey . |
| 3,202,514 | 8/1965 | Burgess et al. ................... 426/74 |
| 3,284,211 | 11/1966 | Williams . |
| 3,365,297 | 1/1968 | Burgess et al. . |
| 3,467,525 | 9/1969 | Hale et al. . |
| 3,482,985 | 12/1969 | Burgess . |
| 3,561,972 | 2/1971 | Dodge et al. . |
| 3,595,666 | 7/1971 | Danning . |
| 3,615,647 | 10/1971 | Kassens . |
| 3,615,652 | 10/1971 | Burgess . |
| 3,658,548 | 4/1972 | Hass . |
| 3,679,429 | 7/1972 | Mohrman . |
| 3,808,340 | 4/1974 | Palmer . |
| 3,857,968 | 12/1974 | Hass et al. . |
| 3,862,336 | 1/1975 | Kofsky et al. ..................... 426/1 |
| 3,959,511 | 5/1976 | Balaz et al. . |
| 3,962,462 | 6/1976 | Bunkwall, Jr. et al. . |
| 3,968,255 | 7/1976 | Hass et al. . |
| 4,000,319 | 12/1976 | Eichelburg . |
| 4,006,266 | 2/1977 | Bone et al. . |
| 4,029,821 | 6/1977 | Munro . |
| 4,032,665 | 6/1977 | Miller et al. . |
| 4,048,342 | 9/1977 | Hass et al. . |
| 4,054,674 | 10/1977 | Barker et al. ..................... 426/805 |
| 4,070,490 | 1/1978 | Lugay et al. . |
| 4,089,978 | 5/1978 | Lugay et al. . |
| 4,104,406 | 8/1978 | Stringer et al. . |
| 4,104,407 | 8/1978 | Stringer et al. . |
| 4,118,512 | 10/1978 | Eichelburg . |
| 4,143,171 | 3/1979 | Buckley et al. . |
| 4,158,706 | 6/1979 | Ernest et al. . |
| 4,160,038 | 7/1979 | Groben et al. ..................... 426/53 |
| 4,169,162 | 9/1979 | Appleman . |
| 4,190,679 | 2/1980 | Coffee et al. . |
| 4,191,781 | 3/1980 | Schara et al. . |
| 4,208,442 | 6/1980 | Evans et al. . |
| 4,229,485 | 10/1980 | Brown et al. . |
| 4,247,562 | 1/1981 | Bernotavicz . |
| 4,265,913 | 5/1981 | Eichelburg . |
| 4,267,195 | 5/1981 | Boudreau et al. . |
| 4,282,254 | 8/1981 | Franzen et al. . |
| 4,294,857 | 10/1981 | Fuller . |
| 4,296,132 | 10/1981 | Lazarus et al. . |
| 4,356,002 | 10/1982 | Todd . |
| 4,358,468 | 11/1982 | Dolan et al. . |
| 4,366,175 | 12/1982 | Brown et al. . |
| 4,391,829 | 7/1983 | Spardlin et al. . |
| 4,418,086 | 4/1983 | Marino et al. . |
| 4,427,704 | 1/1984 | Cheney et al. . |
| 4,454,162 | 6/1984 | Schanze . |
| 4,508,741 | 4/1985 | Corbett et al. . |
| 4,643,908 | 2/1987 | Sawhill ........................ 425/805 |
| 4,702,924 | 10/1987 | Owens et al. . |

FOREIGN PATENT DOCUMENTS 945881 1/1964 United Kingdom .

Primary Examiner—R. B. Penland
Attorney, Agent, or Firm—Richard Kornutik

[57] ABSTRACT

A chewy, semi-plastic, non-extruded, non-porous, microbiologically-stable dog food which includes: 12 to about 30 weight percent, based upon the total weight of the dog food, of gelatin; at least one acidulant; at least one cereal starch-containing textural agent; at least one release agent; at least one taste agent; at least one sugar; salt; and added water. The dog food is in a molded form. The dog food has a pH of about 3 to 5, and has a moisture content of about 10 to about 25 weight percent, based upon the weight of the dog food. The process for preparing the dog food includes: (a) mixing the dry components and liquid components with low speed agitation and continuing the mixing until a dough is obtained; (b) forming the dough by molding or rotary molding into molded snack or biscuit; (c) conditioning the molded dough at 185° to 200° F. for about 7 to 8 minutes; and (d) packaging the molded dog snack or biscuit in a protective package.

30 Claims, No Drawings

CHEWY DOG SNACKS

BACKGROUND OF THE INVENTION

1. Field Of The Invention

The invention relates to dog foods and to methods of preparing such.

2. Prior Art

Canadian Pat. No. 560,490 discloses a process for obtaining a pet food having a pH of about 2.0 to 5.0. The pH of a pet food is adjusted to a pH of about 2.0 to 5.0. The pet food is then heated to between about 140° to 200° F. (usually for about 15 minutes) and stuffed into a container (for example a plastic bag), which is cooled after being sealed. The pre-cooked pet food contains proteinaceous meaty materials. The specification (col. 3) states that the moisture content can vary widely, as desired, but the lowest water range given is 30 to 40 percent. Examples of the pH adjusters are citric acid and acid salts.

U.S. Pat. No. 3,115,409 (Hallinan et al.) corresponds to Canadian Pat. No. 560,490.

U.S. Pat. No. 3,202,514 (Burgess et al.) discloses a deformable, moist, shape-retaining, meat-based animal food having a pH of 6.0 to 8.0. The moisture level is 15 to 35 percent. The animal food can contain an antimycotic agent such as sorbic acid. The broad disclosure in the specification of Burgess et al. is not limited to a pH of 6.0 to 8.0, but all of its claims are. Burgess et al. clearly asserts that a product with a high acid value is unpalatable. Burgess et al. states:

"Moreover, if one deviated from the critical conditions disclosed in Hallinan et al., viz., 'hot' packaging and adjustment of product pH to an acid range, microbiological decomposition and spoilage is encountered on a scale which, heretofore, rendered such a product unfit for animal consumption."

"In addition, the acid values of Hallinan et al.'s composition will hydrolyze the sugars and proteins present giving rise to unsightly darkening as well as off odors in the product. Importantly, moreover, a product of a high acid value detracts from palatability. Yet animal food formulators and processors apparently have believed that in order to stabilize a product of more than about 10% moisture without commercial sterilization or freezing, pH adjustment to less than 4.5 as well as 'hot' packaging was necessary." [col. 2, lines 53 to 68]

U.S. Pat. No. 3,862,336 (Kofsky et al.) seeks to provide an intermediate moisture animal food which, after packaging in moisture-proof wrapping material, could be stored in non-refrigerated conditions without the risk of microbiological spoilage. The plasticity and viscosity of its product is stated to be controllable by the nature and quantity of the gelling and binding agents. The animal food composition of Kofksy et al. is substantially neutral. The disclosure of Kofsky et al. regarding ingredients and amounts thereof shows that Kofsky et al. is very similar to Burgess et al. The main areas where Kofsky et al. differs from Burgess et al. is the absence of cooking/pasteurization treatment and the addition of a water-soluble gum or gelatin.

The microbiologically stable, substantially neutral, nutritionally balanced, semi-plastic non-pasteurized, uncooked animal food composition of Kofsky et al. consists essentially of (1) a dried proteinaceous food substance, (2) an aqueous matrix including a water soluble colloidal binding and gelling agent (i.e., gelatin or water soluble-gum), and (3) a water soluble, low molecular weight solid, liquid or mixture thereof in an amount sufficient to increase the osmotic pressure of the water in which it is dissolved thereby providing a bacteriostatic effect. The moisture content of the food composition ranges from about 15 percent to not greater than 25 percent. The amount of the gum or gelatin ranges from about ½ to about 10 percent by weight. The process for preparing the animal food composition involves blending a premix of the solids with a proportional amount of a pre-mix of the liquid with high-speed agitation.

Citric acid is used in the dog biscuits marketed by Nabisco, Inc , under the registered trademark "MILK BONE". Dogs like the flavor provided by the citric acid.

Acidulants are used in processed food products as an aid in sterilization. Sterilization of canned food products, in particular, depends on the thermal kill efficiency of the heat applied in retorts and other processing equipment. Many bacteria are highly resistant to heat and in some instances revert to a spore form which can survive high temperatures for a long period of time. Incomplete sterilization can result in instances of botulism or food spoilage. Bacteria and other deleterious microorganisms are more susceptible to thermal kill in a low pH environment. So acidification to lower the pH to a safe level is often used. Many food products, which formerly could not have been adequately sterilized, are now safely processed and maintained for long periods of time through the technique of acidification. Johnson, Arnold H., et al., "Encyclopedia Of Food Technology", The Avis Publishing Company, Inc., (1974), p. 1.

Star-Kist Foods, Inc., markets "Smoky Link" dog snacks. The label contains the copyright date of 1987. The label listed ingredients are ground wheat, water, beef, soybean meal, propylene glycol (a preservative), pregelatinized wheat flour, animal fat preserved with BHA, dried whole egg, natural smoke flavoring, salt, phosphoric acid, milk protein hydrolysate, potassium sorbate (a preservative), choline chloride, papain, artificial colors, Vitamin E supplement, Vitamin A supplement, niacin, calcium pantothenate, riboflavin, Vitamin $D_3$ supplement, Vitamin $B_{12}$ supplement, pyridoxine hydrochloride, thiamine, mononitrate, and folic acid.

BROAD DESCRIPTION OF THE INVENTION

An object of the invention is to provide a chewy dog snack that is highly palatable, has good microbiological stability, can be stored in non-refrigerated conditions, and is easy to prepare. Another object of the invention is to provide processes for the production of the chewy dog snack.

The invention involves a chewy, semi-plastic, microbiologically-stable dog food, which is a dog snack or biscuit. The dog snack includes: 12 to about 30 weight percent, based upon the total weight of the dog food, of gelatin; at least one edible acidulant; at least one edible cereal starch-containing textural agent; at least one edible release agent; at least one edible taste agent; at least one edible sugar; salt; and added water. The dog food is in a molded form. The dog food has a pH of about 3 to 5, and has a moisture content of about 10 to about 25 weight percent, based upon the weight of the dog food. The dog food is a longer lasting dog treat, is flexible without a breakage problem, provides a longer chew and is like a soft, moist dog snack in texture. It is also highly nutritional.

Preferably the invention dog food is non-extruded, but an extruded dog food comes within the scope of the invention. The invention is preferably non-porous because the porous structure adds less structural integrity and strength to the dog biscuit causing breakage problems, reduces the chewy life of the dog biscuit and requires more packaging space. Biting on a porous dog biscuit of the invention type would tend to give a mushy bite as opposed to a chewy bite.

The required pH and gelatin levels generally impart the desired chewiness to the invention dog snacks. In general the dog snacks are not brittle or gummy. The dog snacks have a good cohesiveness and are somewhat elastic in consistency.

The use of a pH of greater than about 5.0 apparently does not provide the advantages of the use of a lower pH. The high acid dog snack of the invention is highly palatable. At a pH below about 2.0, the food is probably not sufficiently palatable for a commercial product and it may be harmful to animals if consumed in large quantities over a prolonged period of time.

The dog snacks have good keeping qualities even after the packages have been opened. The pet snacks will keep at normal room temperatures for days, while material is being removed each day, thus enabling a dog owner to make full use of a package of food that is only partially used, without need for refrigeration or fear of spoilage.

The invention also includes a process for preparing the invention dog food. The process includes: (a) mixing the dry components and liquid components with low speed agitation and continuing the mixing until a dough is obtained; (b) forming the dough by molding or rotary molding into molded snack or biscuit; and (c) packaging the molded dog snack or biscuit in a protective package.

The process for preparing the chewy dog snacks preferably includes a pasteurization and/or cooking step, but pasteurization and/or cooking steps are not required. The pasteurization and/or cooking step can, for example, occur as part of mixing step (a), can occur between mixing step (a) and molding step (b) and even could occur as part of packaging step (c). Most preferably the pasteurization and/or cooking step between molding step (b) and packaging step (c) is a heat conditioning step. Preferably the heat conditioning step is conducted at 185° to 200° F. for about 7 to 8 minutes (in a 100 to 200 foot commercial oven). The lower the oven temperature, the softer and the less chewy are the resultant dog biscuits.

DETAILED DESCRIPTION OF THE INVENTION

The moisture or water content of the invention dog snacks is about 10 to about 20 weight percent, preferably about 12 to about 17 weight percent. The dog snacks, depending upon the moisture level, are in the upper range of dry dog foods or are in the lower or middle range of semi-moist dog foods. Dry dog foods usually have a moisture range of 15 percent or less; semi-moist dog foods usually have a moisture range of greater than 15 percent up to about 40 percent or so; moist dog foods have higher moisture contents. The moisture level of the invention preferably uses a moisture level that provides a water activity of 0.65 or less. The water level required significantly hydrates the gelatin.

A water content substantially above the invention range makes the dog snack too mushy and non-handleable, thereby resulting in failure of the dog snack to retain the desired shape, while lower moisture contents reduce workability, thereby preventing ready deformation or shaping.

The inclusion of glycerin into the dog snacks is a preferred embodiment. The glycerin allows a reduction in the amount of water added in the formulation of the dough. Molded dog snacks which contain glycerin provide a sharper and better defined logo. The presence of glycerin in the dough during mixing provides an easier, more efficient mixing with no collection of the dough on the mixer blades or paddles. Glycerin is very hygroscopic and can be termed a humectant-plasticizer. Glycerin, being sweet, can also be used as part of the sugars normally used in the dog snacks. Preferably about 2 to about 6 weight percent of glycerin is used in the dog snack, although 0.01 to about 15 weight percent of glycerin can readily be present.

Other edible polyols can be present in addition to or in place of glycerin, but apparently such other polyols do not provide the same excellent results as does glycerin. Examples of such other edible polyols are mannitol, sorbitol and the glycols, such as, propylene glycol. The polyols are hygroscopic and are usually sweet.

The dog snack has a pH of about 2 to 5, preferably about 4.2 to about 4.8, most preferably at about 4.4 to 4.5. The pH range of the dog snack means that it is a high acid pet food. The pet snacks of the invention contain sufficient edible acids to adjust the pH between about 3.0 to 5.0. At a pH greater than about 5.0, the hydrogen ion concentration is too low to attain the advantages of the invention. The pH level has a definite impact on the invention dog snacks. The acid or pH level in the invention is important to the dough and final product textures, and to provide self cleaning of the dough from mixer paddles. If too high of a pH is used, the dough and final product are too tough, tacky and fibrous, and the dough release from the mixer blades or paddles is generally poor.

The use of a pH of 6 to 8 in the invention formulation appears to result in a tough, stringy dough, which tends to stick to the mixer paddles. At a pH level of about 4.4 to 4.5 the invention dough is not tough and stringy, does not stick to the low speed mixer paddles, and can easily be formed in a rotary molder.

One or more edible acidulants can be used in an amount sufficient to achieve the desired pH. The acidulent can be, for example, an edible organic acid, an edible inorganic acid, an edible acid salt, two or more of the same category, and combinations of the categories. Food grade acidulants should be used. Citric acid is the preferred edible acid. Citric acid is preferred because dogs like the flavor that it provides in the dog snacks. Other edible organic acids which can be used are, for example, acetic acid, tartaric acid, lactic acid, malic acid, succinic acid, adipic acid, fumaric acid, propionic acid, sorbic acid and succinic anhydride. Examples of useful edible inorganic acids are phosphoric acid, hydrochloric acid and sulfuric acid. Examples of useful edible acid salts are monobasic sodium phosphate, monocalcium phosphate, aluminum sulfate, aluminum calcium sulfate and aluminum sodium sulfate.

Citric acid, tartaric acid and malic acid provide a tart taste. The tartness of the acidulant helps to balance the sweetness due to the sugars present in the dog snacks.

Buffering agents can be included which assist to maintain the pH in the invention range. Suitable buffering agents are normally the sodium salts of the above acids.

Bicarbonate compounds (salts) and other gas producing compounds are not used in the invention dog snacks or production process, since the gas would tend to produce a porous dog biscuit which has less structural strength, is less chewy and has breakage problems.

The compositions of the invention are not substantially neutral, i.e., pH of 6 to 8.

The dog snacks have excellent resistance against microbiological spoilage (whether of yeast, mold and/or bacterial source).

The dog snack contains from 12 to, say, about 30 weight percent of gelatin, and preferably about 15 to about 22 weight percent of gelatin.

Within the invention composition, the gelatin is a textural agent and a water soluble, colloidal binding-gelling agent. It is believed that the gelatin sets up an aqueous matrix (or other type of matrix) which at the high acid pH of the invention provides a chewy dog snack which is not tough and stringy.

Gelatin is a soluble protein derived from insoluble collagen. Although it can be made from different animal by-products, hide is the common source of gelatin production. The conditions employed during the production of gelatin determine its characteristics. If there is extensive breakdown of peptide bonds, many lateral bonds may remain intact and soluble fragments are produced. If many lateral bonds are destroyed, the gelatin molecules may have relatively long chain lengths. In normal production, the hides or bonds are extracted first under relatively mild conditions, followed by successive extractions under more severe conditions. The first extraction yields the best quality gelatin. The term gelatin is used for products derived from mammalian collagen which can be dispersed in water and show a reversible sol-gel change with temperature. High quality gelatin has an average chain length of 60,000 to 80,000.

Gelatin is manufactured and sold in different bloom strengths. With gelatin, the preferred range of the quantity use will depend on the bloom strength, the desired plasticity and the size of the final product.

Some of the gelatin can be replaced with gluten without loss of chewiness by the dog snack, but the level of the gelatin should not be below 12 weight percent when gluten is used. Generally 0.01 to 8 weight percent, and preferably about 4 weight percent, based upon the total weight of the dog snack, of wheat gluten can be used. The formation of the gluten takes place when contacting the water. The gluten is a coherent elastic mass which helps provide the structure of the dog snacks.

At least one cereal starch-containing textural agent is usually present in an amount of about 5 to about 20 weight percent, preferably about 9 to about 15 weight percent. But note that larger and smaller amounts of the cereal starch-containing textural agents can be used. The preferred cereal starch-containing textural agents are a combination of wheat meal and modified cereal food starch. Examples of other useful cereal starch-containing textural agents are corn starch, wheat starch, rice starch and sorghum. Cereal starches (corn, wheat, rice and sorghum) form viscous short-bodied pastes and set to opaque gels on cooling.

Starch is a polymer of D-glucose, having two different polymers, namely, a linear compound, amylose, and a branched component, amylopectin.

The properties of starches can be modified by chemical treatments. One of the simpler types of modification is acid treatment giving thin-boiling starch. The granules are not greatly affected but the acid penetrates into the intermicellar areas where the structure is weakened by hydrolysis of a small number of bonds. Upon gelatinization of this type of starch the granule disintegrates and gives a solution or paste of low viscosity. A similar result may be obtained by enzyme treatment. The thin boiling starches yield low viscosity pastes but retain the ability to form gels on cooling. Oxidized starches are prepared by treating aqueous starch suspensions with oxidizing agents such as sodium hypochlorite. This treatment reduces viscosity and increases paste clarity. These compounds are suitable as emulsion stabilizers and thickeners. Crossbonded starches are made by reacting starch suspensions with epichlorohydrin, phosphorus oxychloride or sodium trimetaphosphate in the presence of an alkaline catalyst. Crossbonding inhibits disintegration of the swollen cooked granules and ensures that viscosity remains high in the presence of acid and under conditions of shear. Cross-bonded waxy corn starch derivatives are used widely as thickening agents. Other starch derivatives include starch acetate, starch phosphate, starch succinate and hydroxy propyl starch Modified phosphate starch products have low phosphorous contents ranging from 0.01 to 0.20 DS (degree of substitution). DS is the number of phosphate groups per D-glycopyranosyl unit. Monoesters, starch disodium phosphates, are prepared by heating a dry mixture of starch and an acid salt of ortho-, pyro-, or tripolyphosphoric acid. The esters are cold water-soluble and possess high viscosity and thickening power. They do not require cooking. Another phosphate is the diester wherein the phosphate group bridges two starch molecules. Such cross-bonded starches are produced by reacting starch with phosphoryl chloride or by heating starch with trimetaphosphate salts.

The dog snacks can also contain other types of starches, such as, root and tuber starches, and waxy starches. Root and tuber starches (potato, cassava or tapioca) form highly viscous long-bodied pastes. These pastes are usually clear and form only weak gels on cooling. Waxy starches (waxy corn, sorghum and rice) form heavy-bodied stringy pastes. The pastes are clear and have a low tendency for gel formation. High amylose starch (corn) requires high temperatures for gelatinization and gives short bodied paste which forms very firm opaque gels on cooling.

From about 1 to about 20 weight percent, preferably about 4 to about 8 weight percent, of at least one release agent is present in the dog snack. But note that large amounts of the release agents can be used. Preferably lecithin (for example, soy bean lecithin) and fat are both used in the dog snack as release agents. Preferably the fat is partially present in the form of spray-chilled fat and partially present in the form of tallow. Tallow is a white, nearly-taste, solid, rendered fat from cattle and sheep. The release agents are preferably in a solid form at room temperature. The fats are preferably solid fats. Examples of other useful fats are hydrogenated vegetable oils. The release agents assist in the easy removal of the molded dog biscuits from the molds after formation. Fats are essentially triglycerides.

The taste agent or agents are used in an amount of about 10 to about 30 weight percent, preferably about 18 to about 26 weight percent, based upon the total weight of the food snack. But note that larger and smaller amounts of the taste agents can be used. Preferably, beef, liver or poultry meat meal (or powder) and meat and bone meal are both used in the dog snack as taste agents. Preferably the beef meat powder is beef jerky powder. Examples of other useful taste agents are the hydrogenated vegetable oils (which can also be used as the release agent).

The meat meal and bone meal also serve the function of being water absorbents.

Other edible proteinaceous meaty materials in small particle form can be used in conjunction with the meat meal and bone meal Examples of such edible proteinaceous materials are: meat of all kinds, e.g., beef, veal, pork, horsemeat and the like; meat by-products such as beef or pork liver, kidney, heart, spleen, tongue trimmings, lungs and skins; poultry such as chicken, turkey, duck or goose; poultry by-products including chicken, turkey, duck or goose offal (heads, feet, viscera); fish of all kinds, and fish by-products, e.g., heads, offal, etc. Ground edible bone and solubilized bone protein can also be used.

The term "meat" is understood to apply not only to the flesh of cattle, swine, sheep and goats, but also horses, whale and other mammals, poultry and fish. The term "meat by-products" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated. Likewise, the term "meat meal" refers to the finely ground, dry rendered residue from animal tissues including those dried residues embraced by the term in the aforesaid official definition of the Association of American Feed Control Officials, Incorporated. Indeed, the terms "meat," meat by-products," and "meat meal" are understood to apply to all of those animal, poultry and marine products defined by said association.

The dog snacks are packaged in protective packaging material, such as airtight plastic material in a box. The packaging should be airtight so as to prevent drying out of the dog snacks (retards staleness) and to assist in and prolong the storage or shelf life of the dog snacks (retards mold growth and decomposition). Any packaging should be hermetically sealed. Examples of suitable packages or containers are flexible plastic bags.

The salt is present in the dog snack in an amount of about 0.5 to about 8 weight percent, preferably about 3 to about 6 weight percent. The salt acts as a flavorant and taste agent. The salt is also a bacteriostatic agent at the moisture levels in the dog snack.

The at least one sugar is used in an amount of about 8 to 35 weight percent, preferably about 12 to about 26 weight percent, based upon the total weight of the food snack, of the dog snack. But note that larger and smaller amounts of the sugars can be used. In one preferred embodiment corn syrup and honey can both be used. If the sugar composition contains water, the amounts of added water and such sugar composition needs to be balanced so that the required water in the molded dog snack is achieved. The corn syrup can be, for example, a high fructose corn syrup, an acid-converted (high maltose) corn syrup, and an acid-enzyme corn syrup. Conventional corn syrup contains a mixture of dextrose and its polymers. In another preferred embodiment glycerin is used with corn syrup and/or honey - the use of glycerin allows the lowering of the water content.

Examples of other useful sugars are molasses, dextrose, maple sugar, maltose, sucrose, lactose and fructose. In general, any suitable sweet monosaccharide or polysaccharide can be used. The sugar is a bacteriostatic agent at the moisture levels in the dog snack.

Honey usually contains fructose, glucose, water and minor amounts of sucrose, reducing disaccharides and higher sugars.

In more detail, the useful sugars can be: non-reducing and reducing water-soluble mono-saccharides and the reducing and non-reducing polysaccharides and their degradation products; e.g., pentoses, including aldopentoses, methylpentoses, keptopentoses, like xylose and arabinose; a deoxyaldose like rhamnose, hexoses and reducing saccharides such as aldo hexoses like glucose, galactose and mannose; the ketohexoses, like fructose and sorbose; disaccharides, like lactose and maltose; non-reducing disaccharides such as a sucrose and other polysaccharides such as dextrim and raffinose; and hydrolyzed starches which contain as their constituents oligosaccharides.

The flavorant is preferably cheese powder (in an amount of, say, 1 to 4 weight percent) but any other suitable flavorants can be used. Other ingredients, such as, citric acid, sugars, beef meat meal, and meat meal and bone meal, also contribute to the flavor of the dog snacks.

The colorant is preferably iron oxide (for example, the red, yellow or brown forms), when a colorant is used. Other suitable colorants, food grade dyes and pigments, for example, can be used.

Suitable amounts of vitamins and other nutrients can be incorporated into the dog snacks.

The suitable preservative or preservatives are stable in the invention dog snacks (but forms of the preservatives can be used which are converted to the active form in the invention compositions). Examples of the suitable preservatives are benzoic acid, the sodium and other salts of benzoic acid, the sodium, calcium and other salts (propionates) of propionic acid, sorbic acid, the potassium, calcium and other salts (sorbates) of sorbic acid, diethyl pyrocarbonate and menadione sodium bisulfite. Preferably a preservative is not used as it is not usually needed, but a preservative can be used. The preservative is usually used in an amount of about 0.01 to about 4 weight percent, preferably about 0.2 to about 0.4 weight percent, based on the total weight of the dog snack.

Preferably the preservative is an antimycotic Humectants such as propylene glycol and sorbital are also antimycotics.

Minor amounts (usually no more than 0.2 weight percent based on the fat content of the dog snacks) of antioxidants can be used when fat is used in the dog snacks. Examples of suitable antioxidants are butylated hydroxytoluene, butylated hydroxyanisole, propyl gallate and ascorbyl palmitate. The antioxidant can also be placed on the interior surface of the packaging material.

The dog snacks can also contain soybean meal, cotton seed meal, peanut meal, dried buttermilk, dried skimmed milk, casein, dried whole whey, oat meal, soy bran, wheat bran, alfalfa meal, soy bean oil, and fish oil.

The invention dog snacks are preferably non-extruded and are preferably prepared by a process which does not use an extrusion step (e.g., extrusion mixing or extrusion forming). While an extrusion forming step can be used, the extrusion probably is conducted so that the dough is not expanded (at least to any significant degree) and so that the dough and dog snacks are nonporous. The dough in the invention process is formulated as a moldable dough. Moldable doughs can generally also be extruded (Doughs formulated as extrudable doughs generally cannot be molded.) As used herein, extrusion refers to the forcing of the dough through a forming die. (Extrusion is usually done with heated dough, followed by cooling of the extrudate.) To avoid expansion of the dough and formation of a porous material, the pressure drop across the die orifice should be low. The invention dog snacks are not in kibble form. Also the invention dog foods do not have a problem with the darkening of the sugars and proteins. Dried ingredients do not have to be used in the preparation of the dog snacks. The invention dog snacks are not coated with any fat coating and do not have an outer pastry shell.

The dog snack is prepared from a dough, which is generally prepared by mixing the dry and liquid ingredients using low agitation mixing. To achieve the low agitation mixing, mixers such as kneaders and low speed, low agitation mixers can be used.

In one preferred embodiment, the dry ingredients (only the fat is added here as spray chilled fat) are mixed in a low speed, low agitation mixer. Unless otherwise noted, the starting materials are at about ambient temperature. The liquid sugar ingredients are mixed, (a syrup results), the added water is heated to boiling (about 200° F.), the boiling water is added to the syrup, the resultant hot liquid mass is mixed, and the hot liquid mass is added to the mixed dry ingredients in the mixer. The combined ingredients have a temperature of about 95° to 120° F. (depending upon the water content). The relative amount of boiling (or hot) water added to the liquid sugar ingredients generally controls the temperature of the resultant hot liquid mass. The relative amount and the temperature of the hot liquid mass generally controls the temperature of the combined ingredients. The low speed, low agitation mixing continues for about 2.5 minutes. The remaining fat (melted at 130° to 140° F.) is added to the mixer. The mixing continues for about 1.5 minute as low speed, low agitation. The resultant dough is chewy, but is not tough and stringy, and does not stick to the mixer paddles.

The dry ingredients and syrup liquid ingredients can be separately premixed and stored in containers.

The mixing of the dry and liquid ingredients are mixed until a dough of the desired consistency is obtained. The dough has a chewy, semi-plastic consistency.

In order to have a viable commercial process, some heat is necessary (in the form of steam in the processing or in some other conventional form) to bring the total mass to a temperature of approximately 100° to 130° F., so that the gelatin can be dissolved and thoroughly mixed into the dough being prepared.

If a heat treatment is used in the preparation process to effect cooking, pasteurization or heat conditioning, such heat treatment can be done at any stage in the process. Preferably a heat treatment is used and it is in effect a pasteurization and/or cooking step. The heat treatment can be done, for example, during mixing, during packaging or preferably as a separate conditioning step between the forming and packaging steps.

Heating the dough and/or dog snack between about 140° F. and the boiling temperature of the mixture, usually about 213° F. effects pasteurizing and/or sterilizing, as well as effects alteration of the proteinaceous material Preferably the cooking is carried out at temperatures between about 180° F. and 212° F., when atmospheric pressure conditions are maintained. The use of a temperature of at least 160° F. is best as insurance that pasteurization has occurred is desired. (Limited thermal treatment occurs during pasteurization.)

Cooking time is necessarily variable, depending upon the dog food composition, cooking temperature and pressure conditions being maintained in the cooking vessel. In general cooking in large commercial units requires between about 5 and about 30 minutes - smaller units can often take longer The cooking time should not be so long or the cooking temperature so high as to burn, scorch or char the dough. At temperatures in the range of about 180° F. to 212° F., a short period of time of the order of about 10 to 15 minutes is required.

The heating of the materials to be mixed can be done by any suitable means, but preferably the heating is achieved by the injection of steam into some or all of the materials (located in the mixer) to be blended. The steam used is part of the added water.

Mixing at ambient temperature for a very long time will provide the desired dough consistency, but this approach is impractical for a commercial process. Preferably a temperature of 95° to 130° F. is used in the mixing step. If a chewier dog snack is desired, the temperature is increased above such level to say 160° or 180° F. and the dough becomes tougher and stringier and hence chewier.

An advantage of not using a heat treatment significantly above ambient temperature is that the expense of heating and subsequent cooling is not incurred. Also, minimal heating means is needed and cooling equipment is not needed. Further, a process shorter in time can usually be effected without the added time requirements of heating and especially cooling operations. For example, while heating can be achieved in a mixing vessel using steam, cooling usually requires separate equipment or delay time in the mixing vessel for the cooling phase.

The process of the invention can be conducted on a continuous or batch basis.

The dog snacks or biscuits can be molded using a molder or rotary molder. The molding can impress or emboss a logo in the dog biscuit. The logo can be a depressed region with raised letters therein, for example. The dough of the invention provides a logo which is clear and distinct in the molded dog snacks. The temperature of the dough is preferably about 95° to about 105° F. (but can of course be down to that temperature at which the dough becomes too rigid to be satisfactorily molded) before the start of the molding step because at above 105° F. the dough sticks or tends to stick in the molder or rotary molder.

The water content of the dough can be adjusted by drying during preparation of the molded dog food, but it is preferably to formulate the dough so as to have the required amount of water in the molded dog food.

In a most advantageous embodiment, a conditioning step at about 160° to about 200° F. for 10 to 60 minutes (preferably at about 185° F. to 200° F. for about 7 to 8 minutes) is used between the molding and packaging steps. The molded dog snacks are cooled before being packaged.

Any conventional or suitable moisture-protective wrapping material or containers can be used to package the dog snacks. Preferably the molded dog snacks are cooled to 85° F. to ambient temperature.

The packaged dog snacks of the invention have reasonable storage or shelf life without the need for pasteurization and/or cooking, although pasteurization and/or cooking adds to the storage or shelf life of the packaged dog snacks.

Typically the invention dog snack has the following combination of categories (e.g., functional) of ingredients and combination of specific ingredients:

| Categories Of Ingredients | Specific Ingredients |
|---|---|
| (1) textural agents | gelatin, modified food starch and cereal meal |
| (2) release agents | tallow, hydrogenated vegetable oil and lecithin |
| (3) taste agents | meat meal, bone meal, tallow, and beef, liver or poultry meat meal, e.g., jerky powder - optionally hydrogenated vegetable oil |
| (4) pH agent (lowers pH) | food grade acid (citric acid) |
| (5) sugars | corn syrup and glycerin or corn syrup and honey |
| (6) water absorbents | meat meal and bone meal |
| (7) added water | water |
| (8) salt (NaCl) | salt (NaCl) |
| (9) preservative | preservative |
| (10) flavorant | flavorant |
| (11) colorant | colorant |

Unless otherwise stated herein or obvious herefrom to one skilled in the art, all temperatures are in °F., all ratios, percentages and proportions are on a weight basis, and all weight percentages are based on the total weight of the dog snack. All ingredients herein are used at levels effective to fulfill their functions.

EXAMPLE 1

The ingredients of the chewy dog snack of this example are as follows:

| Ingredients | Amount Wt. Percent |
|---|---|
| (1) gelatin | 20.0 |
| (2) salt | 5.0 |
| (3) lecithin | 0.75 |
| (4) modified food starch | 5.0 |
| (5) wheat meal | 8.0 |
| (6) fat | 5.0 |
| (7) beef, liver or poultry meat meal | 11.0 |
| (8) colorant | 0.25 |
| (9) meat and bone meal | 9.5 |
| (10) cheese meal | 2.0 |
| (11) citric acid | 1.5 |
| (12) corn syrup | 12.0 |
| (13) honey | 12.0 |
| (14) water | 8.0 |

Ingredients (1) to (11) (only 3.0 weight percent of the fat is added here as spray chilled fat) are mixed in a low speed, low agitation mixer. Liquid ingredients (12) and (13) are mixed (a syrup results), the water is heated to 212° F., the hot water is mixed into the syrup, and the hot mixture of liquids is added to the mixed dry ingredients in the mixer. The low speed, low agitation mixing continues for about 2.5 minutes. The remaining 2.0 weight percent of fat (tallow-melted at 130° to 140° F.) is added to the mixer. The mixing continues for about 1.5 minute at low speed, low agitation. The resultant dough is chewy, but is not tough and stringy, and does not stick to the mixer paddles. The mixed composition (dough) is formed into dog biscuits (snacks) using molding or a rotary molder (the consistency of which is like play dough). At the time of forming the dough has cooled to a temperature of about 95° to 105° F. The formed dog snacks are passed through an oven which is at 185° to 200° F., cooled to 80° to 85° F. and packaged in a protective packaging material (prevents drying out). The dog snacks are well shaped and well defined with a clear logo thereon. The result is a semi-moist dog snack having about 14 weight percent of water, a water activity of 0.65 or less, and a pH of 4.4. The dog snack is a longer lasting dog treat, is flexible without a breakage problem, provides a longer chew and is like a soft, moist dog snack in texture.

EXAMPLE 2

Example 1 is repeated except that enough citric acid is used to provide a pH of 4.25. The results are similar to those achieved in Example 1.

EXAMPLE 3

Example 1 is repeated except that enough citric acid is added to provide a pH of 4.1. The dough has worse characteristics in the mixer, e.g., the dough somewhat sticks to the mixer blades.

EXAMPLE 4

Example 1 is repeated except that 3 weight percent of glycerin is also added and only 5 to 6 weight percent of water is added. The mixing characteristics are as good as or better than those achieved in Example 1. The logo on the dog snacks is sharper and better defined.

EXAMPLE 5

The ingredients of the chewy dog snack of this example are as follows:

| Ingredients | Amount, |
|---|---|
| gelatin | 16.0 |
| salt | 4.0 |
| preservative | 0.3 |
| lecithin compound | 0.5 |
| modified food starch | 4.5 |
| cereal meal | 10.0 |
| citric acid | 2.5 |
| flavorants | 3.0 |
| hydrogenated vegetable oil | 2.0 |
| meat meal and bone meal | 22.0 |
| colorants | 0.2 |
| corn syrup | 10.0 |
| honey | 10.0 |
| water (added) | 10.0 |
| tallow | 5.0 |

Meat, e.g., jerky powder, baked Milk Bone ® in meal form and other similar materials can be added in addition to or in place of part of the meat meal and/or bone meal.

The dry and liquid ingredients are mixed in a low speed, low agitation mixer, the mixing being continued until a dough is formed which has a consistency like play dough. The dough is formed into dog biscuits (snacks) by means of molding or a rotary molder. The dog snacks are conditioned at 180° F. for 30 minutes. The dog snacks are cooled and packaged in a protective packaging material (prevents drying out). The dog snacks are well shaped and well defined with a clear logo thereon. The result is a semi-moist dog snack having 13.75 weight percent of water, a water activity of 0.65 or less, and a pH of 4.5. The dog snack is a longer lasting dog treat, is flexible without a breakage problem, provides a longer chew and is like a soft, moist dog snack in texture.

EXAMPLE 6

The ingredients of the chewy dog snack of this example are as follows:

| Ingredients | Amount, Weight Percent |
|---|---|
| gelatin | 16.0 |
| salt | 4.0 |
| preservative | 0.3 |
| lecithin | 0.5 |
| modified food starch | 4.5 |
| cereal meal | 10.0 |
| citric acid | 2.5 |
| flavorants | 3.0 |
| hydrogenated vegetable oil | 2.0 |
| meat meal and bone meal | 22.0 |
| colorants | 0.2 |
| corn syrup | 10.0 |
| glycerin, 95% | 4.0 |
| water (added) | 16.0 |
| tallow | 5.0 |

Meat, e.g., jerky powder, can be added in addition to or in place of part of the meat meal and/or bone meal in the above formulation.

The dry and liquid ingredients are mixed in a low speed, low agitation mixer, the mixing being continued until a dough is formed which has a consistency like play dough. The dough is formed into dog biscuits (snacks) by means of molding or a rotary molder. The dog snacks are conditioned at 180° F. for 30 minutes. The dog snacks are cooled and packaged in a protective packaging material (prevents drying out). The dog snacks are well shaped and well defined with a clear logo thereon. The result is a semi-moist dog snack having 13.75 Weight percent of water, a water activity of 0.65 or less, and a pH of 4.5. The dog snack is a longer lasting dog treat, is flexible without a breakage problem, provides a longer chew and is like a soft, moist dog snack in texture.

EXAMPLE 7

Example 6 is repeated except that no citric acid is added to the mixture from which the dough is prepared. The dough is not suitable to prepare a final product. The dough is a very tough, tacky and very fibrous mass.

EXAMPLE 8

Example 6 is repeated except that only enough citric acid is added to provide a dough having a pH of 5.84 (same as in the final product). The dough is not as tough as the dough in Example 6 and develops somewhat tacky. The dough release from the mixer paddle is satisfactory.

EXAMPLE 9

Example 6 is repeated except that a pH of 4.41 is used. The dough releases clean from the (Hobart) mixer paddle and is not as fibrous as the doughs in Examples 6 and 7.

EXAMPLE 10

Example 6 is repeated except that a pH of 4.84 is used. There is satisfactory mixing of the dough, however, the clarity of the embossing imprint on the rotaried pieces can be improved.

EXAMPLE 11

The ingredients of the chewy dog snack of this example are as follows:

| Ingredients | Amount, Weight Percent |
|---|---|
| (1) gelatin | 20 |
| (2) salt | 5 |
| (3) lecithin | 0.5 |
| (4) modified food starch | 5 |
| (5) wheat meal | 8 |
| (6) fat (spray-chilled) | 2.5 |
| (7) beef meat meal | 11 |
| (8) colorant | 0.25 |
| (9) meat and bone meal | 10.75 |
| (10) cheese power | 2 |
| (11) corn syrup | 12 |
| (12) honey | 12 |
| (13) water (added) | 9 |
| (14) preservative | 0.25 |
| (15) tallow | 2 |
| (16) citric acid | 1.25 |

Ingredients (1) to (10) and (14) to (16)(only 2.5 weight percent of the fat is added here as spray chilled fat) are mixed in a low speed, low agitation mixer. Liquid ingredients (11) and (12) are mixed, (a syrup results), the water is heated to 200° F., the hot water is mixed into the syrup, and the hot mixture of liquids is added to the mixed dry ingredients in the mixer. The low speed, low agitation mixing continues for 2 to 2.5 minutes. The remaining 2.0 weight percent of fat (melted at 130° to 140° F.) is added to the mixer. The mixing continues for 1.5 minute at low speed, low agitation. The resultant dough was chewy, but was not tough and stringy, and did not stick to the mixer paddles. The mixed composition (dough) is formed into dog biscuits (snacks) using molding or a rotary molder (the consistency of which is like play dough). At the time of forming the dough has cooled to a temperature of about 95° to 105° F. The formed dog snacks are cooled and packaged in a protective packaging material (prevents drying out). The dog snacks are well shaped and well defined with a clear logo thereon. The result is a semi-moist dog snack having 13.75 weight percent of water, a water activity of 0.65 or less, and a pH of 4.5. The dog snack is a longer lasting dog treat, is flexible without a breakage problem, provides a longer chew and is like a soft, moist dog snack in texture.

EXAMPLE 12

The formulation in Example II of U.S. Pat. No. 3,862,336 (Kofsky et al.) is closely duplicated and pH assays are run for two samples of the formulation in 10 percent solution. (Such closely-duplicated Example II of Kofsky et al. has 2.5 percent gelatin.) The assays results in pH readings of 5.93 and 5.96.

EXAMPLE 13

The formulation in Example II of U.S. Pat. No. 3,862,336 (Kofsky et al.) is closely duplicated, except that enough additional gelatin is added to bring the total gelatin content up to 10 percent. Two samples of the gelatin-rich formulation in 10 percent solution are subjected to pH assay; the result is pH readings of 5.94 and 6.01.

What is claimed is:

1. Process for preparing a chewy, semi-plastic, non-extruded, non-porous, microbiologically-stable dog food consisting essentially of
   (i) about 12 to about 30 weight percent, based upon the total weight of the dog food, of gelatin;
   (ii) at least one edible acidulant;
   (iii) about 5 to about 20 weight percent, based upon the total weight of the dog food, of at least one edible cereal starch-containing textural agent;
   (iv) about 1 to about 20 weight percent, based upon the total weight of the dog food, of at least one edible release agent;
   (v) about 10 to about 30 weight percent, based on the total weight of the dog food, of at least one edible taste agent;
   (vi) about 6 to about 35 weight percent, based upon the total weight of the dog snack, of at least one edible sugar;
   (vii) about 0.5 to about 8 weight percent, based on the total weight of the dog snack, of salt; and
   (viii) added water, said dog food being a snack or biscuit in a molded form, said dog food having a pH of about 3 to 5, said dog food having a moisture content of about 10 to about 20 weight percent, based upon the total weight of the dog food, and said dog food being chewy, semiplastic, non-extruded, non-porous and microbiologically-stable, said process consisting essentially of:
      (a) mixing dry components and liquid components with low speed agitation and continuing the mixing until a dough is obtained;
      (b) forming the dough by molding or rotary molding into molded snack or biscuit; and
      (c) packaging the molded dog snack or biscuit in a protective package.

2. Process as claimed in claim 1 wherein mixing step (a) is conducted a temperature of at 160° to 220° F. for 5 to 15 minutes.

3. Process as claimed in claim 1 wherein mixing step (a) is conducted at a temperature of 140° F. to 200° F. for 3 to 15 minutes.

4. Process as claimed in claim 1 wherein heat conditioning of the molded dog food at about 160° to about 250° F. for 2 to 10 minutes is conducted between forming step (b) and packaging step (c) and then the molded dog food is cooled before packaging step (c).

5. Process as claimed in claim 1 wherein, in forming step (b), the dough is at a temperature of 105° F. or below.

6. Process as claimed in claim 1 wherein, in mixing step (a), the dry components are mixed, the at least one edible sugar being in liquid form, the liquid sugar components are mixed, water is heated to about 212° F., the water is added to the liquid sugar components, the heated liquid components are added to the mixture of dry components and the combination of the dry components and liquid components is mixed.

7. Process as claimed in claim 6 wherein the dog food includes fat, part of the fat is in the dry components that are mixed, and, after the mixing of the combination of the dry components and the liquid components, part of the fat is melted and mixed with such combination.

8. Process as claimed in claim 1 wherein the dog food includes about 2 to about 6 weight percent, based upon the total weight of the dog food, of gluten.

9. Process as claimed in claim 1 wherein mixing step (a) is conducted with the application of heat.

10. Process as claimed in claim 9 wherein the heat is applied in the form of steam.

11. Process as claimed in claim 1 wherein step (a) is conducted at a temperature of 95° to 130° F.

12. Process as claimed in claim 1 wherein the gelatin is present in an amount of about 15 to about 22 weight percent.

13. Process as claimed in claim 1 wherein 0.01 to 8 weight percent, based on the total weight of the dog food, of gluten is also present.

14. Process as claimed in claim 1 wherein the acidulant is citric acid.

15. Process as claimed in claim 1 wherein the acidulant is an edible organic acid.

16. Process as claimed in claim 1 wherein the cereal starch-containing textural agent is wheat meal and a modified food starch.

17. Process as claimed in claim 1 wherein the release agent is lecithin, hydrogenated vegetable oil, fat or combinations thereof.

18. Process as claimed in claim 1 wherein the taste agent is beef, liver or poultry meat meal or powder, hydrogenated vegetable oil, meat and bone meal, or combinations thereof.

19. Process as claimed in claim 1 wherein the sugar is corn syrup, invert sugar, invert syrup, honey, glycerin, or combinations thereof.

20. Process as claimed in claim 1 wherein at least one water absorbent is present.

21. Process as claimed in claim 1 wherein the dog food is pasteurized and cooked.

22. Process as claimed in claim 1 wherein the acidulant is at least one edible organic acid and/or at least one inedible inorganic acid and/or at least one edible acid salt and the at least one sugar is at least on polyol.

23. Process as claimed in claim 22 wherein the edible polyol is glycerin, mannitol, sorbitol or propylene glycol.

24. Process as claimed in claim 22 wherein the at least one cereal starchy-containing textural agent is wheat meal and a modified food starch.

25. Process as claimed in claim 22 wherein the at least one cereal starch-containing textural agent is corn starch, wheat starch, rice starch, sorghum, wheat meal or a modified wheat starch.

26. Process as claimed in claim 22 wherein the at least one release agent is lecithin, hydrogenated vegetable oil, fat or combinations thereof.

27. Process as claimed in claim 22 wherein the at least one taste agent is beef, liver or poultry meat meal or powder, hydrogenated vegetable oil, meat and bone meal, or combinations thereof.

28. Process as claimed in claim 22 wherein the at least one edible organic acid is citric acid, acetic acid, tartaric acid, lactic acid, malic acid, succinic acid, adipic acid, fumaric acid, propionic acid, sorbic acid or succinic anhydride.

29. Process as claimed in claim 22 wherein the at least one edible inorganic acid is phosphoric acid, hydrochloric acid or sulfuric acid.

30. Process as claimed in claim 22 wherein the at least one edible acid salt is monobasic sodium phosphate, monocalcium phosphate, aluminum sulfate, aluminum calcium sulfate or aluminum sodium sulfate.

* * * * *